US008550891B2

(12) United States Patent
Suttle

(10) Patent No.: US 8,550,891 B2
(45) Date of Patent: Oct. 8, 2013

(54) POKER SYSTEM AND METHOD INVOLVING DRAW OUT PROTECTION

(75) Inventor: James Suttle, North Las Vegas, NV (US)

(73) Assignee: Tru Odds Poker, LLC, Las Vegas, NV (US)

( * ) Notice: Subject to any disclaimer, the term of this patent is extended or adjusted under 35 U.S.C. 154(b) by 243 days.

(21) Appl. No.: 13/030,478

(22) Filed: Feb. 18, 2011

(65) Prior Publication Data

US 2012/0214565 A1 Aug. 23, 2012

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................. 463/13; 463/11; 463/16; 463/20; 463/42; 273/292; 273/309

(58) Field of Classification Search
USPC ............. 463/11, 13, 16, 20, 42; 273/292, 309
See application file for complete search history.

(56) References Cited

U.S. PATENT DOCUMENTS

| | | | | |
|---|---|---|---|---|
| 5,816,918 | A * | 10/1998 | Kelly et al. | 463/16 |
| 6,070,873 | A | 6/2000 | Perkins | |
| 2002/0039923 | A1 * | 4/2002 | Cannon et al. | 463/42 |
| 2003/0052452 | A1 | 3/2003 | Spur | |
| 2006/0205484 | A1 | 9/2006 | Nicastro | |
| 2007/0173318 | A1 | 7/2007 | Abbott | |
| 2008/0088087 | A1 | 4/2008 | Weitzman et al. | |
| 2008/0237985 | A1 | 10/2008 | Cogert et al. | |
| 2009/0117989 | A1 * | 5/2009 | Arezina et al. | 463/20 |
| 2009/0124314 | A1 * | 5/2009 | Halligan et al. | 463/13 |
| 2009/0170583 | A1 * | 7/2009 | Moody | 463/13 |
| 2010/0216532 | A1 * | 8/2010 | Halverson | 463/11 |

FOREIGN PATENT DOCUMENTS

| | | |
|---|---|---|
| KR | 10-2005-0099073 A | 10/2005 |
| WO | WO 2010-143005 A1 | 12/2010 |

* cited by examiner

*Primary Examiner* — Omkar Deodhar
*Assistant Examiner* — Adetokunbo O Torimiro
(74) *Attorney, Agent, or Firm* — Greenberg Traurig

(57) ABSTRACT

A draw out point system and method. Points may be derived from odds associated with a player winning a hand when the player is subjected to a draw out. For example, if a first player has an 80% chance of winning a hand against a second player once no bets are possible, the first player is awarded 80 points corresponding to the 80% chance of winning responsive to a draw out by the second player. Alternatively, points are based on a value of a pot at the time of the draw out. After the tournament, players may be awarded payouts commensurate with earned points until a draw out pool is exhausted. To fund the draw out pool, players pay an extra tournament fee or portion of the tournament fee may be allocated to a draw out pool. Operators retain a portion of the draw out pool to increase operator revenue.

11 Claims, 3 Drawing Sheets

POKER SYSTEM AND METHOD INVOLVING DRAW OUT PROTECTION

FIELD OF THE INVENTION

The embodiments of the present invention relate to poker tournaments system and method for generating draw out pools which provide payouts to tournament players being subjected to numerous or low probability draw outs.

BACKGROUND

Poker has become a very popular game to the masses because of televised poker events and online remote access to live poker games. In other words, poker play is more mainstream and access is greatly improved. While poker has become very popular, there continue to be negative situations arising during poker games which may cause players to become discouraged with poker. One primary negative situation is the draw out during which a player having a lower probability of winning a poker hand beats one or more other players. For example, in Texas Hold'em a draw out can occur when a first player holds three of a kind after the turn and a second player holds an inside straight draw. If the second player hits the card needed to complete the straight, the first player has been drawn out. One or more draw outs during a poker tournament can discourage tournament players lowering the number of players entering tournaments and thus lowering operator revenue.

Therefore, it would be beneficial to incorporate a system and method for rewarding in some fashion players suffering from one or more draw outs during poker tournaments. Advantageously, the draw out system and method should be configured to allow operators to generate additional revenue.

SUMMARY

Accordingly, a first embodiment of the present invention is a point generation system and method whereby players aggregate points during a poker tournament based on being subjected to draw outs. In one embodiment, points are derived from the initial odds of the drawn out player winning the hand. For example, if a first player has an 80% chance of winning a hand against a second player after no more bets are possible, the first player is awarded 80 points correlating to the 80% chance of winning. The points may then be given a monetary value (e.g., 10 cents per point). Once the tournament ends, players may be awarded payouts commensurate with the earned points until the draw out pool is exhausted. Alternatively, a pre-established number (e.g., 10) of top point earners may split the draw out pool in a pre-established fashion. To fund the draw out payouts, players may pay an extra fee to participate in the tournament or some portion of the existing tournament fee may be allocated to a draw out pool.

The draw out payouts may be established by the house or operator. Similarly, as explained in more detail below, the house or operator can determine the number of tournament players to receive draw out payouts and the amounts thereof. In general, the embodiments of the present invention seek to reward or reimburse a player for being subjected to numerous draw outs during a tournament. A large number of draw outs decreases or prevents the player from cashing and more so winning the tournament.

Other variations, embodiments and features of the present invention will become evident from the following detailed description, drawings and claims.

DETAILED DESCRIPTION

Figure 1:
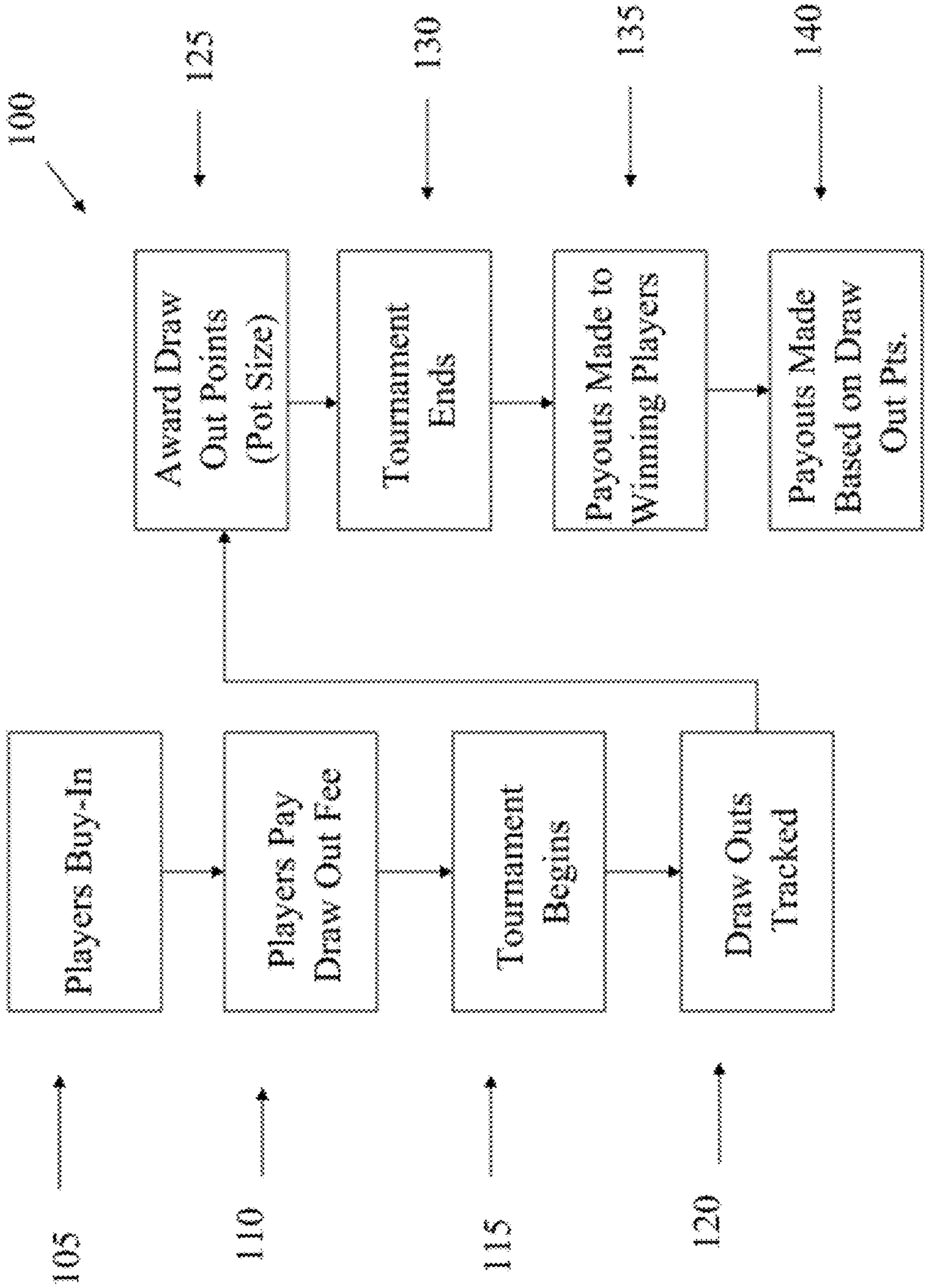
FIG. 1 illustrates a flow chart detailing one embodiment according to the embodiments of the present invention.

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The embodiments of the present invention relate to a system and method for rewarding players subjected to one or more draw outs during a poker tournament. The poker game may any type including Texas Hold'em, Omaha and Stud. For the sake of brevity, the detailed description focuses on Texas Hold'em. The embodiments of the present invention are also suitable for both electronically implemented poker tournaments and live poker tournaments.

In a first embodiment, an electronically implemented poker tournament is facilitated by online systems or other electronic means. In an online system, remote users (i.e., poker players) access a dedicated website to participate in poker games and tournaments. Online systems are facilitated by one or more servers which host the dedicated website and run poker software which players access via a computer terminal (e.g., desktop or laptop) or hand-held device (e.g., smart phone, cellular phone, PDA, etc.). Online poker websites are well-known such that the specific technology behind such websites is not necessary other than as described herein to explain the embodiments of the present invention.

FIG. 1 shows a flow chart 100 detailing one embodiment of the present invention. At 105, players buy-in a tournament. The amount of the buy-in fee is established by the operator or house. At 110, players pay a draw out fee. Again, the amount of the draw out fee is established by the operator or house. Ideally, the amount of the draw out fee is a percentage of the buy-in fee. For example, if the buy-in fee is $100 the draw out fee may be $10. Therefore, if the tournament attracts 500 players, the tournament prize pool is $50,000 and the draw out pool is $5,000. The operator retains a pre-established percentage (e.g., 15%) or certain amount of the draw out pool which increases operator revenue. At 115, the tournament begins. At 120, draw outs occurring during the tournament are tracked. Draw outs occur when there are two or more players remaining in the hand but no more betting can occur. That is, one or more players remain and one or both players are all in. Or three players remain and two or more are all in. In this embodiment, at 125, players subjected to a draw out receive points based on a odds/percentages as described below.

In one embodiment, as shown in FIG. 1, the points are calculated based on the odds/percentages associated with the losing player winning the hand at the point in time when the betting ended. For example, a first player holding a pair of Aces prior to the flop has an 81.06% chance of winning the hand against a second player holding a pair of Kings who has an 18.55% chance of winning (there is a 0.39% chance the hand ends in a tie). Thus, if no betting can occur after the hole cards are dealt and prior to the flop and the second player wins, the first player has been subjected to a draw out resulting in award of 81.06 points commensurate with the odds of the first player winning the hand. Alternatively, the player subjected to the draw out receives points commensurate with the percentages associated with the winning hand. That is, with the previous example, the losing player is awarded 18.55 points. Players drawing out may also receive points commensurate with the odds which may be used to provide payouts to the players drawing out against other players.

In another embodiment, only draw outs in excess of pre-established odds leads to a player earning points. For example, the drawn out player must have at least a 65% chance of winning the hand in order to earn points for being subjected to a draw out. Otherwise, no points are awarded. In another embodiment, as shown in FIG. 2, a simpler system involves awarding each player one point for each draw out without regard to the odds associated with players winning the hand.

Figure 3:
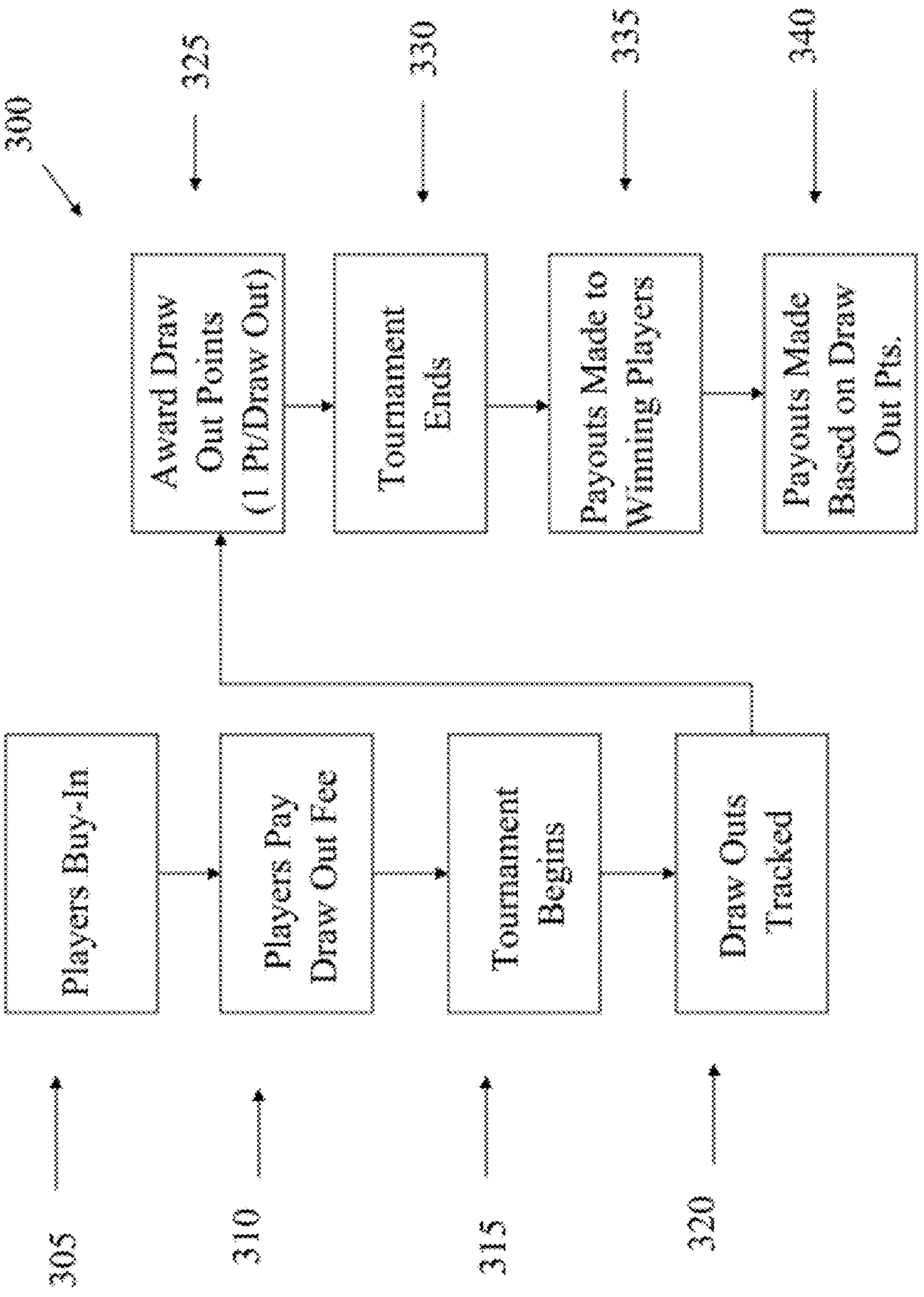
FIG. 3 illustrates a flow chart detailing a third embodiment according to the embodiments of the present invention.

In another embodiment, as shown in FIG. 3, the draw out points are based on the pot amount at the time of the draw out. Therefore, the larger the pot, the more points awarded to the player subjected to the draw out. Prior to the tournament, a tiered pot scheme is generated based on the chips in play. For example, a pot up to $500 corresponds to 10 points; a pot of $501 to $1000 corresponds to 20 points; a pot of $1001 to $3000 corresponds to 30 points; and any pot above $3000 corresponds to a pot of 40 points. Those skilled in the art will recognize that countless point schemes based on the value of the pot are possible and within the spirit and scope of the present invention. When based on the value of the pot, the value of side pots may reduce the points awarded to the player subjected to the draw out. The following example assumes in a Texas Hold'em game that a first player holds a pair of Aces and has $3000; a second player holds a pair of Kings and has $5000; and a third player holds Jack/Queen and has $5200. If the player holding Aces goes all in and the Jack/Queen raises to $5000 and the player with the pair of Kings calls, the main pot is $9000 while the side pot is $4000. Thus, if the player with the Aces is subjected to a draw out, the player wins points corresponding to the $9000 since that is the only pot the player can win. If the player holding the pair of Kings loses the side pot to the player holding the Jack/Queen, the player wins points corresponding to $4000.

At 130, the tournament ends. At 135, players finishing in the money are paid from the prize pool. Conventionally, roughly the final 10% of the total players receive a payout from the tournament prize pool with payouts increasing for players lasting longer in the tournament. For example, the top point earner may receive 25% of the draw out pool and the second place earner may receive 22% and the third place earner may receive 18% and so on. At 140, those players with the most draw out points receive a payout from the draw out pool. In one embodiment, only players not finishing in the money of the tournament are eligible for a payout from the draw out pool. In this embodiment, tracking draw outs may cease once the number of players remaining equals the number of players to be paid from the tournament prize pool. In another embodiment, any and all players are eligible for a payout from the draw out pool. The operator or house may establish rules for payouts from the draw out pool. For example, the players corresponding to the top ten point totals may receive a payout from the draw out pool based on a pre-established apportionment formula. Alternatively, the points may be monetized in a pre-established manner (e.g., each point is worth 10 cents). The draw out pool is then used to pay the top point earners until the draw out pool is exhausted.

Figure 2:
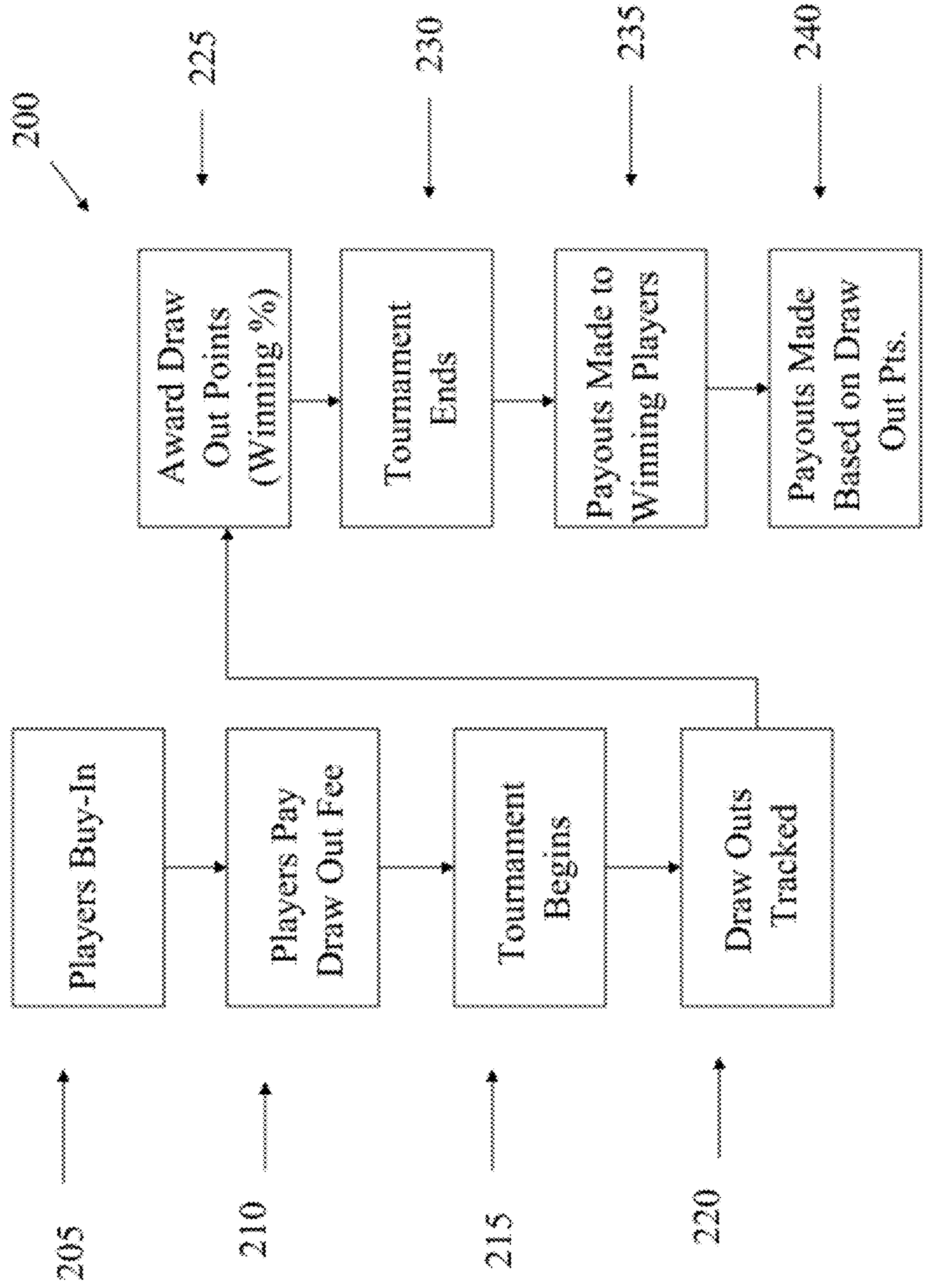
FIG. 2 illustrates a flow chart detailing a second embodiment according to the embodiments of the present invention.

FIG. 2 shows a flow chart 200 detailing one embodiment of the present invention. At 205, players buy-in a tournament. At 210, players pay a draw out fee. Again, the amount of the draw out fee is established by the operator or house. At 215, the tournament begins. At 220, draw outs occurring during the tournament are tracked. At 225, players subjected to a draw out receive points based on a simple point per draw out formula. At 230, the tournament ends. At 235, players finishing in the money are paid from the prize pool. At 240, those players with the most draw out points receive a payout from the draw out pool.

FIG. 3 shows a flow chart 300 detailing one embodiment of the present invention. At 305, players buy-in a tournament. At 310, players pay a draw out fee. Again, the amount of the draw out fee is established by the operator or house. At 315, the tournament begins. At 320, draw outs occurring during the tournament are tracked. At 325, players subjected to a draw out receive points based on a simple point per draw out formula. At 330, the tournament ends. At 335, players finishing in the money are paid from the prize pool. At 340, those players with the most draw out points receive a payout from the draw out pool.

In an online environment, poker software maintained on an Internet server tracks draw outs as they occur and calculates points (regardless of the method) associated therewith. Real time draw out point totals are displayed for players to observe top point earners akin to displaying tournament chip leaders. Online poker websites incorporate tournament data of which draw out points may be another. The software also facilitates payouts from the tournament prize pool and draw out pool whether based on percentages, pot size, simple point system and the like. The Internet server is accessible via a computer terminals or hand-held device (e.g., smart phone). Those skilled in the art will understand that the operation and functionality of online poker websites are well-known and need not be described with great detail herein.

Although the invention has been described in detail with reference to several embodiments, additional variations and modifications exist within the scope and spirit of the invention.

I claim:

1. A method of conducting an electronically implemented poker tournament comprising:

configuring a system comprising at least a processor and memory device to facilitate:

identifying draw outs occurring during said poker tournament;

utilizing a point system based on: (i) theoretical winning percentages associated with hand outcomes of players involved in the draw out; or (ii) a value of a pot associated with hand outcomes of players involved in the draw out;

maintaining a record of draw outs associated with each player during said poker tournament wherein said record includes aggregate point totals awarded to each player subjected to one or more draw outs during said poker tournament, said record being stored on said memory device; and providing payouts from a draw out pool to one or more players of said poker tournament based on said point totals of players being subjected to draw outs.

2. The method of claim 1 further comprising funding said draw out pool using fees paid by players to participate in the poker tournament.

3. The method of claim 1 further comprising providing payouts from the draw out pool to a pre-established number of players having the highest point totals.

4. A method of conducting an electronically implemented poker tournament comprising:

configuring a system comprising at least a processor and memory device to facilitate:

identifying draw outs occurring during said poker tournament;

utilizing a point system based on: (i) theoretical winning percentages associated with hand outcomes of players involved in the draw out; or (ii) a value of a pot associated with hand outcomes of players involved in the draw out;

maintaining a record of draw outs associated with each player during said poker tournament, said record including aggregated point totals for each player subjected to one or more draw outs during said tournament and being stored on said memory device; and providing payouts from a draw out pool to one or more players of said poker tournament based on said point totals of players being subjected to draw outs.

5. The method of claim 4 further comprising utilizing a point system based on: (i) theoretical winning percentages associated with hand outcomes of players involved in the draw out wherein a winning hand's theoretical winning percentage must exceed a threshold winning hand percentage.

6. The method of claim 4 further comprising funding said draw out pool using fees paid by players to participate in the poker tournament.

7. The method of claim 4 further comprising providing payouts from the draw out pool to a pre-established number of players having the highest point totals.

8. A method of conducting an electronically implemented poker tournament comprising:

configuring a system comprising at least a processor and memory device to facilitate:

identifying draw outs occurring during said poker tournament;

utilizing a point system based on: (i) theoretical winning percentages associated with hand outcomes of players involved in the draw out; or (ii) a value of a pot associated with hand outcomes of players involved in the draw out;

maintaining a record of draw outs associated with each player during said poker tournament, said record including aggregated point totals for each player subjected to one or more draw outs during said tournament and being stored on said memory device; and associating a monetary value to each point awarded to players;

providing payouts from a draw out pool to one or more players of said poker tournament based on said associated monetary value.

9. The method of claim 4 further comprising utilizing a point system based on: (i) theoretical winning percentages associated with hand outcomes of players involved in the draw out wherein a winning hand's theoretical winning percentage must exceed a threshold winning hand percentage.

10. The method of claim 8 further comprising funding said draw out pool using fees paid by players to participate in the poker tournament.

11. The method of claim 8 further comprising providing payouts from the draw out pool to a pre-established number of players having the highest point totals.

* * * * *